United States Patent
Jeoung

(10) Patent No.: US 12,157,470 B2
(45) Date of Patent: Dec. 3, 2024

(54) RAPID ACCELERATION MODE SYSTEM OF VEHICLE AND METHOD FOR CONTROLLING THE SAME

(71) Applicants: Hyundai Motor Company, Seoul (KR); Kia Corporation, Seoul (KR)

(72) Inventor: Dong Won Jeoung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 175 days.

(21) Appl. No.: 17/872,505

(22) Filed: Jul. 25, 2022

(65) Prior Publication Data

US 2023/0103009 A1 Mar. 30, 2023

(30) Foreign Application Priority Data

Sep. 30, 2021 (KR) .................. 10-2021-0129327

(51) Int. Cl.
*B60W 30/182* (2020.01)
*B60L 58/13* (2019.01)
(Continued)

(52) U.S. Cl.
CPC ........... *B60W 30/182* (2013.01); *B60L 58/13* (2019.02); *B60W 30/18127* (2013.01);
(Continued)

(58) Field of Classification Search
CPC ......... B60W 30/182; B60W 30/18127; B60W 40/08; B60W 40/105; B60W 50/14; B60W 2050/0024; B60W 2050/0083; B60W 2510/0657; B60W 2510/0676; B60W 2510/246; B60W 2510/107; B60W 2510/244; B60W 20/19; B60W 30/18172; B60W 2510/087; B60W 2720/106; B60W 10/08; B60W 10/10; B60W 40/107; B60W 2050/0022; B60W 2050/143; B60W 2520/10; B60L 58/13; B60L 2240/443; B60L 2240/445; B60L 2240/485;
(Continued)

(56) References Cited

U.S. PATENT DOCUMENTS

2019/0193750 A1\* 6/2019 Kim .................... B60W 10/08
2019/0276045 A1\* 9/2019 Chow .................. B60W 10/08

FOREIGN PATENT DOCUMENTS

CN 108340904 A \* 7/2018 ............ B60W 10/02
KR 10-2021-0019614 A 2/2021

\* cited by examiner

*Primary Examiner* — Lindsay M Low
*Assistant Examiner* — Omar Morales
(74) *Attorney, Agent, or Firm* — Fox Rothschild LLP

(57) ABSTRACT

Disclosed are a rapid acceleration mode system of a vehicle and a method for controlling the same which may provide personalized user options for rapid acceleration. In particular embodiments, the system includes an input device configured to receive a user input regarding whether or not to select a rapid acceleration mode; a storage configured to store at least one of a state reference of a battery and a state reference of a vehicle powertrain; a notification device configured to inform a user whether or not the vehicle enters the rapid acceleration mode; and a controller configured to determine whether or not the vehicle is capable of entering the rapid acceleration mode, and to output whether or not the vehicle is capable of entering the rapid acceleration mode through the notification device.

14 Claims, 4 Drawing Sheets

(51) Int. Cl.
    *B60W 30/18*      (2012.01)
    *B60W 40/08*      (2012.01)
    *B60W 40/105*     (2012.01)
    *B60W 50/14*      (2020.01)
    *B60W 50/00*      (2006.01)

(52) U.S. Cl.
    CPC .......... *B60W 40/08* (2013.01); *B60W 40/105* (2013.01); *B60W 50/14* (2013.01); *B60L 2240/443* (2013.01); *B60L 2240/445* (2013.01); *B60L 2240/485* (2013.01); *B60L 2240/545* (2013.01); *B60W 2050/0024* (2013.01); *B60W 2050/0083* (2013.01); *B60W 2510/0657* (2013.01); *B60W 2510/0676* (2013.01); *B60W 2510/246* (2013.01)

(58) Field of Classification Search
    CPC ............... B60L 2240/545; B60L 58/12; B60L 2240/423; B60L 2240/425; B60L 15/20; B60L 2250/10; B60Y 2200/91; Y02T 10/70; Y02T 10/7072
    USPC ........................................................ 701/102
    See application file for complete search history.

RAPID ACCELERATION MODE SYSTEM OF VEHICLE AND METHOD FOR CONTROLLING THE SAME

CROSS-REFERENCE TO RELATED APPLICATION

This application is based on and claims the benefit of Korean Patent Application No. 10-2021-0129327, filed on Sep. 30, 2021, in the Korean Intellectual Property Office, the disclosure of which is incorporated herein by reference in its entirety.

TECHNICAL FIELD

Embodiments of the present disclosure relate to a rapid acceleration mode system of a vehicle and a method for controlling the same, and more particularly, to a system, which may be applied to electric vehicles (EVs) and enable a user to set an acceleration level, a deceleration level, a rapid acceleration mode duration time, and whether or not to output a driving sound so as to provide a rapid acceleration mode desired by the user, and a method for controlling the same.

DESCRIPTION OF RELATED ART

In general, vehicles have various driving modes. Representatively, there are a general mode used in general driving, an economy mode executed to improve fuel economy, and a sport mode executed in the state in which a vehicle is driven while maintaining a high RPM.

Although there are different detailed characteristics depending on vehicle manufacturers, generally in the economy mode, when a user (driver) depresses an accelerator pedal of a vehicle, the vehicle is controlled so as to prevent rise in the RPM as much as possible without intactly transmitting pedal effort to a drive engine, and unnecessary output and shifting of the vehicle are prevented, thereby being capable of reducing unnecessary fuel consumption. That is, unnecessary acceleration is reduced by decreasing a torque as much as possible.

In the sport mode, the high RPM is always maintained and thus the vehicle may be rapidly accelerated and, when the user depresses the accelerator pedal, the vehicle sensitively reacts, and instantaneous acceleration of the vehicle is increased due to delay of the shift timing.

These modes are different in that a torque generated at wheels varies depending on the mode. Therefore, the user may select one out of the driving modes so as to match a situation and may use the selected driving mode.

On a road, a situation in which instantaneous acceleration must be secured when the vehicle passes another vehicle or due to increase in a speed limit may occur, and the user may secure the instantaneous acceleration of the vehicle by depressing hard the accelerator pedal, converting the driving modes so as to generate a greater torque to an equivalent accelerator pedal input, or changing the control of a motor so as to release a torque limit.

However, in the above-described methods, in the general driving mode and the economy mode, when the user depresses hard the accelerator pedal, the user must withstand the reaction force of the pedal and thus is easily tired due to repeated depressing of the pedal, and, in the sport mode, a large torque is generated even at a small accelerator pedal input and thus it is difficult for the user to acquire instantaneous acceleration at the moment the user wants.

Further, when the driving mode is converted into another driving mode in order to secure instantaneous acceleration, the driving mode is not automatically converted after securing the instantaneous acceleration, the vehicle is driven in the sport mode before the driver manually converts the driving mode, and thus, a large torque is generated and thereby fuel economy (electric economy) may be reduced.

In addition, when the torque limit is continuously released, a large amount of heat is generated, and thus, continuous use of this method exerts a negative influence on durability of the motor.

The above information disclosed in the Background section is only for enhancement of understanding of the background of the disclosure and should not be interpreted as conventional technology that is already known to those skilled in the art.

SUMMARY

Therefore, embodiments of the present disclosure has been made in view of the above problems, and it is an object of embodiments of the present disclosure to provide a rapid acceleration mode system of a vehicle, which includes an input device configured to receive a user input regarding whether or not to select a rapid acceleration mode, a storage configured to store at least one of a state reference of a battery and a state reference of the vehicle powertrain, a notification device configured to inform a user whether or not the vehicle enters the rapid acceleration mode, and a controller configured to determine whether or not the vehicle is capable of entering the rapid acceleration mode by comparing a current state of the battery or the vehicle powertrain with the state reference of the battery or the state reference of the vehicle powertrain when user selection of the rapid acceleration mode is input through the input device, and to output whether or not the vehicle is capable of entering the rapid acceleration mode through the notification device, and a method for controlling the same.

In accordance with an exemplary embodiment of the present disclosure, the above and other objects can be accomplished by the provision of a rapid acceleration mode system of a vehicle, including an input device configured to receive a user input regarding whether or not to select a rapid acceleration mode, a storage configured to store at least one of a state reference of a battery and a state reference of the vehicle powertrain, a notification device configured to inform a user whether or not the vehicle enters the rapid acceleration mode, and a controller configured to determine whether or not the vehicle is capable of entering the rapid acceleration mode by comparing a current state of the battery or the vehicle powertrain with the state reference of the battery or the state reference of the vehicle powertrain when user selection of the rapid acceleration mode is input through the input device, and to output whether or not the vehicle is capable of entering the rapid acceleration mode through the notification device.

The state reference of the battery may include a state of charge (SOC) or a temperature of the battery, and the state reference of the vehicle powertrain may include a temperature of a motor or a transmission.

The storage may store user settings for at least one of an acceleration level, a deceleration level, a duration time of the rapid acceleration mode, and a driving sound, and, when the vehicle enters the rapid acceleration mode, the controller may control driving of a motor or the driving sound based on the user settings stored in the storage, so as to vary at least one of the acceleration level of the vehicle, the deceleration level of the vehicle, the duration time of the rapid acceleration mode, and the driving sound.

The storage may further store a user setting regarding whether or not to perform shifting in the transmission when the vehicle enters the rapid acceleration mode, and the controller may vary a gain value of a motor torque depending on whether or not to perform shifting in the transmission stored in the storage.

In a case in which shifting in the transmission is allowed when the vehicle enters the rapid acceleration mode, the controller may vary the gain value of the motor torque based on the stored acceleration level.

In the case in which shifting in the transmission is allowed when the vehicle enters the rapid acceleration mode, the controller may control a transmission to be upshifted when a speed of the vehicle exceeds a designated value and may increase the gain value of the motor torque simultaneously with control of the transmission.

In a case in which shifting in the transmission is not allowed when the vehicle enters the rapid acceleration mode, the controller may vary the gain value of the motor torque based on the stored acceleration level.

When the vehicle enters the rapid acceleration mode, the controller may control a regenerative braking amount of the vehicle depending on the stored deceleration level.

In accordance with another embodiment of the present disclosure, there is provided a method for controlling the rapid acceleration mode system, the method including storing at least one of the state reference of the battery and the state reference of the vehicle powertrain in the storage, receiving, by the input device, the user input regarding whether or not to enter the rapid acceleration mode, outputting, by the controller, whether or not the vehicle is capable of entering the rapid acceleration mode by comparing the current state of the battery or the vehicle powertrain with the state reference of the battery or the state reference of the vehicle powertrain stored in the storage, informing a user whether or not the vehicle enters the rapid acceleration mode, and controlling driving of a motor of the vehicle or a driving sound depending on entry of the vehicle to the rapid acceleration mode.

In the storing the at least one of the state reference of the battery and the state reference of the vehicle powertrain in the storage, user settings for at least one of an acceleration level, a deceleration level, a duration time of the rapid acceleration mode, and the driving sound may be further stored.

In the controlling driving of the motor of the vehicle or the driving sound, a regenerative braking amount of the vehicle may be controlled depending on the deceleration level stored in the storage, when the vehicle enters the rapid acceleration mode.

In the storing the at least one of the state reference of the battery and the state reference of the vehicle powertrain in the storage, a user setting regarding whether or not to perform shifting in the transmission when the vehicle enters the rapid acceleration mode may be further stored and, in the controlling driving of the motor of the vehicle or the driving sound, a gain value of a motor torque may be varied depending on whether or not to perform shifting in the transmission.

When shifting in the transmission is allowed in the storing the at least one of the state reference of the battery and the state reference of the vehicle powertrain in the storage, in the controlling driving of the motor of the vehicle or the driving sound, the gain value of the motor torque may be varied depending on the stored acceleration level, when the vehicle enters the rapid acceleration mode.

In the controlling driving of the motor of the vehicle or the driving sound, a transmission may be controlled to be upshifted when a speed of the vehicle exceeds a designated value, and the gain value of the motor torque may be increased simultaneously with control of the transmission.

When shifting in the transmission is not allowed in the storing the at least one of the state reference of the battery and the state reference of the vehicle powertrain in the storage, in the controlling driving of the motor of the vehicle or the driving sound, the gain value of the motor torque may be varied depending on the stored acceleration level, when the vehicle enters the rapid acceleration mode.

As discussed, the method and apparatus suitably include use of a controller or processer.

In another embodiment, vehicles are provided that comprise an apparatus as disclosed herein.

BRIEF DESCRIPTION OF THE DRAWINGS

The above and other objects, features and other advantages of embodiments of the present disclosure will be more clearly understood from the following detailed description taken in conjunction with the accompanying drawings, in which.

DETAILED DESCRIPTION

Figure 1:
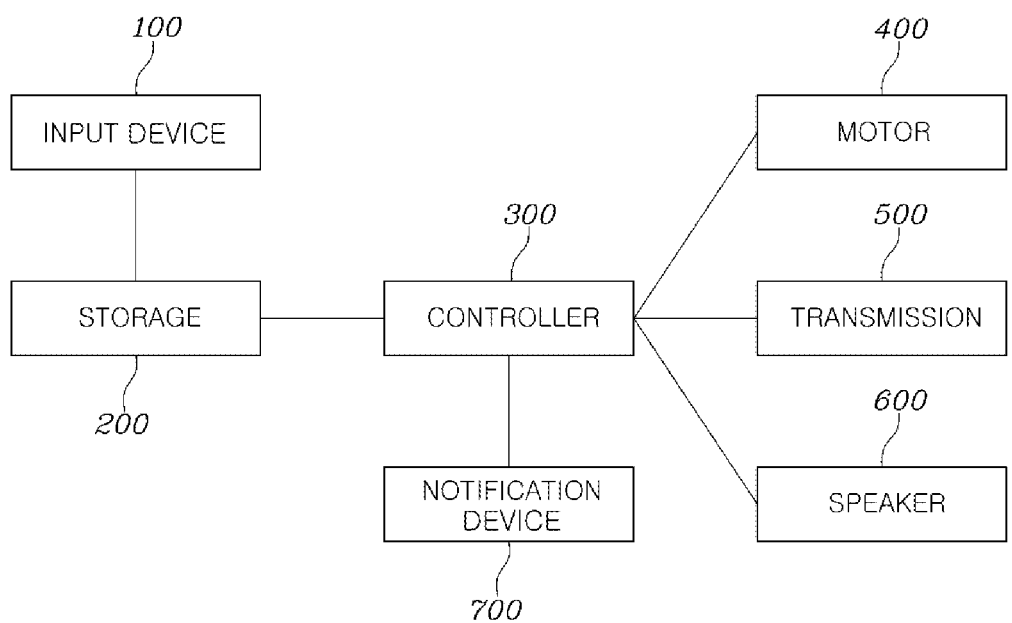
FIG. 1 is a block diagram of a rapid acceleration mode system of a vehicle according to one embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of embodiments of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will be made in detail to the preferred embodiments of the present disclosure, examples of which are illustrated in the accompanying drawings. In the following description of embodiments of the present disclosure, a detailed description of known functions and configurations incorporated herein will be omitted when it may make the subject matter of embodiments of the present disclosure rather unclear. While the present disclosure will be described in conjunction with exemplary embodiments, it will be understood that the present description is not intended to limit embodiments of the present disclosure to the exemplary embodiments. On the contrary, embodiments of the present disclosure is intended to cover not only the exemplary embodiments, but also various alternatives, modifications, equivalents and other embodiments, which may be within the spirit and scope of embodiments of the present disclosure as defined by the appended claims.

FIG. 1 is a block diagram of a rapid acceleration mode system of a vehicle according to one embodiment of the present disclosure. The rapid acceleration mode system according to one embodiment of the present disclosure may include an input device 100, a storage 200, a notification device 700 and a controller 300.

The input device 100 may enable a user to select the rapid acceleration mode when the user desires to drive the vehicle in the rapid acceleration mode, and thus serves to induce the vehicle to enter the rapid acceleration mode by. The input device 100 may be disposed on a steering wheel of the vehicle or a center fascia of the vehicle or be located on a shift lever of the vehicle or may be a physical switch. Alternatively, the input device 100 may be a touch key which is located on an audio, video and navigation (AVN) system of the vehicle and is operated by heat caused by the body temperature of the user or pressure.

The storage 200 may store at least one of the state reference of a battery and the state reference of a vehicle powertrain. The at least one of the state reference of the battery and the state reference of the vehicle powertrain (a motor 400, a transmission 500 or the like) stored in the storage 200 may be a standard for determination as to whether or not the vehicle enters the rapid acceleration mode.

The controller 300 may determine whether or not the vehicle is capable of entering the rapid acceleration mode by comparing the current state of the battery or the vehicle powertrain with the state reference of the battery or the state reference of the vehicle powertrain when user selection of the rapid acceleration mode is input through the input device 100, and control the vehicle powertrain so that the vehicle enters the rapid acceleration mode upon determining that the vehicle is capable of entering the rapid acceleration mode.

The notification device 700, when entry of the vehicle into the rapid acceleration mode is allowed or not allowed, receives a value output from the controller 300 and informs the user of the received value, and the notification device 700 may be provided at any position where information may be transmitted to the user, such as at the center fascia of the vehicle, or the like.

The state reference of the battery includes the state of charge (SOC) or the temperature of the battery, and the state reference of the vehicle powertrain may include the temperature of the motor 400 or the transmission 500. Of course, it may be determined whether or not entry of the vehicle into the rapid acceleration mode is allowed based on information regarding the voltage values of individual cells of the battery, durability of the motor 400 or the transmission 500 or the like.

The controller 300 may receive the SOC and the temperature of the battery and the temperatures of the motor 400 and the transmission 500, measured by sensors in the vehicle, and determines whether or not the vehicle enters the rapid acceleration mode by comparing the received values with the state references stored in the storage 200.

The storage 200 may further store user settings for at least one of an acceleration level, a deceleration level, a duration time of the rapid acceleration mode, and a driving sound.

The storage 200 may serve to store user options regarding the rapid acceleration mode. Concretely, the storage 200 may store settings for an acceleration level, a deceleration level and a duration time of the rapid acceleration mode, which are desired by the user when the vehicle enters the rapid acceleration mode, and on or off of a driving sound informing the user that the vehicle enters the rapid acceleration mode through a sense of hearing when the vehicle enters the rapid acceleration mode.

For example, the acceleration level may be set to one of level 1 to level 10, and the deceleration level may be the same. When the user wants to secure the maximum instantaneous acceleration, the acceleration level may to set to the highest level.

When the user sets the deceleration level and then stores the set deceleration level, the regenerative braking amount of the vehicle may be controlled depending on the stored deceleration level. Concretely, the regenerative braking amount may be increased as the deceleration level is increased, and the regenerative braking amount may be decreased as the deceleration level is decreased.

Further, the user may set the duration time of the rapid acceleration mode. For example, the duration time of the rapid acceleration mode may be set to a specific time up to 1 minute, or the rapid acceleration mode may be set to be released at the moment when the user completely takes his/her foot off the accelerator pedal because it is regarded that a sufficient acceleration is secured, in some cases.

Further, an electric vehicle is driven using a motor in contrast to an internal combustion engine vehicle, and thus causes less noise compared to the internal combustion engine vehicle. Therefore, although the electric vehicle enters the rapid acceleration mode, it may be difficult for the user to determine whether or not the vehicle enters the rapid acceleration mode depending on user's auditory ability. In order to prepare for this case, the vehicle may inform the user that the vehicle enters the rapid acceleration mode by generating a driving sound through a speaker 600 in the vehicle when the vehicle enters the rapid acceleration mode. The driving sound may be a voice saying, for example, "The vehicle has entered the rapid acceleration mode." so that the user may easily recognize the driving sound or may be a sound similar to an engine sound at the high RPM of an internal combustion engine, in some cases. The driving sound may be set according to user preference.

The user settings stored in the storage 200 may be set through the AVN system in the vehicle, or user settings may be input through a mobile application and be transmitted to the vehicle through wireless communication technology, such as Bluetooth or the like.

Further, the storage 200 may store user settings of individuals. That is, user 1, user 2, users 3 to 10, and other users may store their own user settings for the rapid acceleration mode according to their preference in the storage 200, may call in the stored values, and may drive the vehicle based on the values.

In a different way, the vehicle may identify the user in the vehicle by recognizing the biometric information (the fingerprint, weight, iris, etc.) of the user, and may automatically call in the user settings for the rapid acceleration mode matching the user.

The controller 300, when the vehicle enters the rapid acceleration mode, may control driving of the motor 400 or the driving sound based on the user settings stored in the storage 200, thereby being capable of varying at least one of the acceleration level, the deceleration level, the duration time of the rapid acceleration mode, and the driving sound.

Concretely, when the user sets the acceleration level to a middle level, the controller 300 may control the motor 400 so that a torque generated at wheels due to a pressure input to the accelerator pedal is increased by 10% to 50% of the torque generated in the general driving mode.

That is, assuming that a motor torque, generated when the accelerator pedal is depressed by 50% in the general driving mode, is 1200 Nm, the controller 300 may control the motor 400 so that a motor torque, generated when the accelerator pedal is depressed by 50% in the rapid acceleration mode, is 1320 Nm to 1800 Nm.

As such, in the rapid acceleration mode, the instantaneous acceleration of the vehicle may be secured by setting the gain value increased by 10% to 50% of the motor torque generated due to driving of the motor 400 to the motor toque (or the gain value being expressed as 1.1 to 1.5), and releasing the torque limit which the motor 400 has in the general driving mode (or in the economy mode) (here, 10 and 50 being just arbitrary values and thus being easily changed as required).

The controller 300 may control the regenerative braking amount depending on the deceleration level, and control of the duration time of the rapid acceleration mode and the driving sound has been described above and a detailed description thereof will thus be omitted.

The electric vehicle obtains driving force by driving the motor 400 using electricity as fuel. In contrast to the internal combustion engine, the motor 400 may output the maximum torque based on power supply without requiring a four-stroke cycle (intake-compression-power transmission-exhaust), and thus does not essentially require a transmission. However, the transmission may be provided in some electric vehicles for a special purpose. However, in this case, the transmission in the electric vehicles has a small number of gear positions compared to the transmission in the general internal combustion engine vehicles. In general, a one-speed transmission and a two-speed transmission are mainly used.

Hereinafter, the rapid acceleration mode system according to embodiments of the present disclosure will be described based on an electric vehicle provided with the two-speed transmission mounted therein.

The storage 200 may further store a user setting regarding whether or not to perform shifting in the transmission 500, when the vehicle enters the rapid acceleration mode. That is, when the vehicle enters the rapid acceleration mode, the user may set whether or not to operate the transmission 500. Therefore, the controller 300 may vary the gain value of the motor torque depending on whether or not to perform shifting in the transmission 500.

That is, the controller 300 may vary the gain value of the motor torque based on the acceleration level stored in the storage 300 by dividing a case in which shifting in the transmission 500 is allowed and a case in which shifting in the transmission 500 is not allowed from each other.

Figure 2:
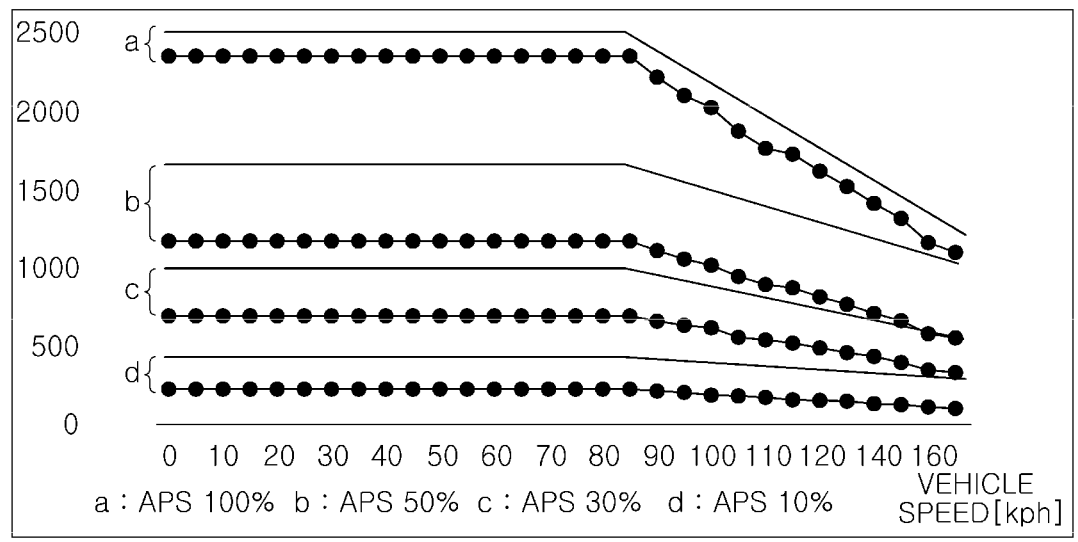
FIG. 2 is a wheel torque map in a case in which shifting is not allowed when a vehicle enters a rapid acceleration mode.

For example, in the case in which shifting is not allowed, the controller 300 may control the motor 400 based on a wheel torque map shown in FIG. 2. Referring to FIG. 2, when the vehicle enters the rapid acceleration mode, the controller 500 may vary the gain value of the motor torque so as to generate a greater wheel torque value than the wheel torque value in the general driving mode.

Figure 3:
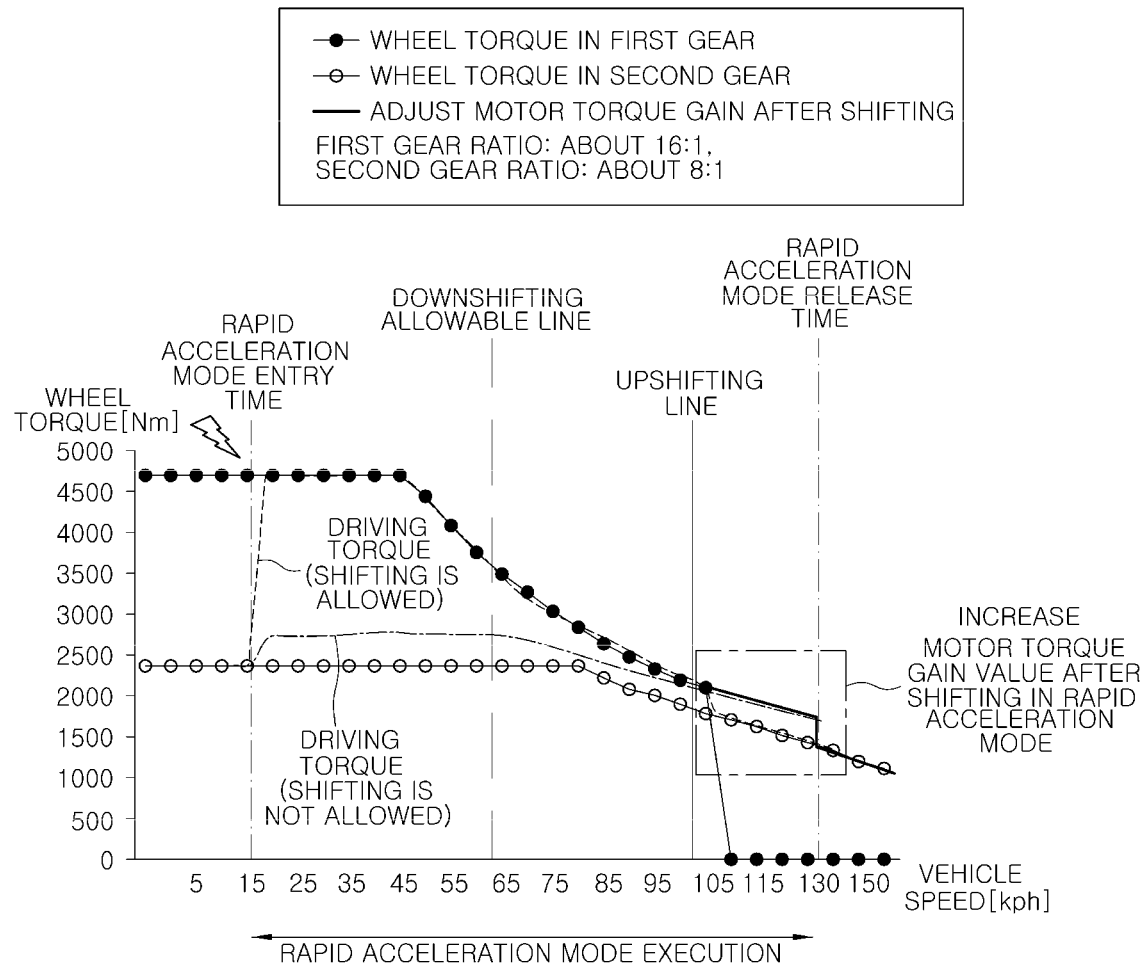
FIG. 3 is a wheel torque map in a case in which shifting is allowed when the vehicle enters the rapid acceleration mode.
Figure 4:
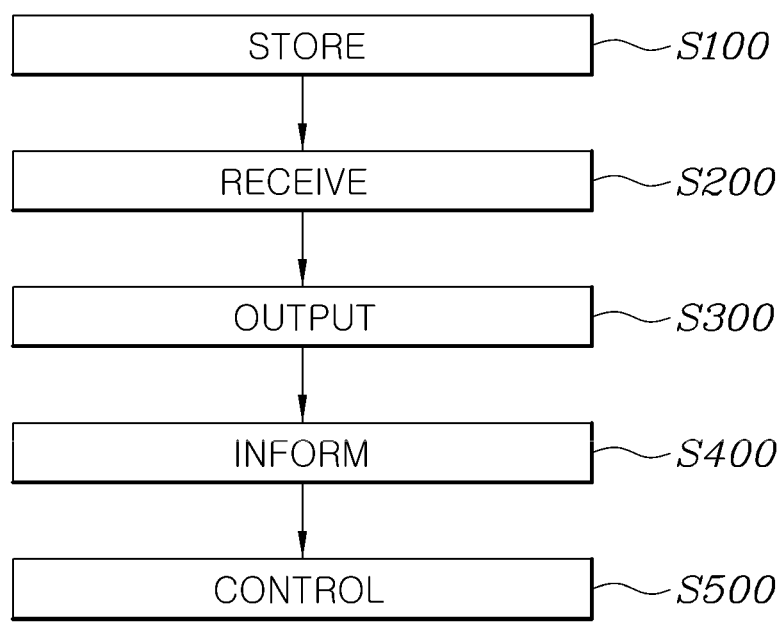
FIG. 4 is a flowchart representing a method for controlling the rapid acceleration mode system according to one embodiment of the present disclosure.

In the case in which shifting is allowed, the controller 300 may control the motor 400 based on a wheel torque map in which shifting is allowed, as shown in FIG. 3.

Referring to FIG. 3, assuming that the vehicle being driven at a speed of 15 km/h in second gear enters the rapid acceleration mode, and shifting is allowed, the vehicle is shifted to first gear (downshifted) and the wheel torque is increased. Then, the wheel torque is gradually decreased, and the speed of the vehicle is gradually increased. Thereafter, when the speed of the vehicle reaches about 100 km/h, the vehicle is shifted to second gear (upshifted). The reason why the vehicle is shifted to second gear is that upshifting must be performed at more than a specific speed due to a gear ratio. Here, the gain value of the motor torque is increased after shifting and increase in the gain value of the motor torque may prevent the vehicle speed from dropping due to shifting and prevent the user from feeling a sense of difference due to shifting.

That is, in the case that shifting is allowed in the rapid acceleration mode, the gain value of the motor torque may be set to 1 at a specific speed (100 km/h in FIG. 3) or lower so as to generate the same wheel torque value as in the general driving mode. That is, a sufficient wheel torque value is generated due to downshifting, and no gain may be assigned to the motor torque. However, when the vehicle speed exceeds the specific speed, upshifting must be performed due to the gear ratio, and thus, the gain value of the motor torque may be set to a value exceeding 1 so that the user may not feel a sense of difference due to shifting.

When the vehicle enters the rapid acceleration mode under the condition that the vehicle is driven at a vehicle speed of 60 km/h or higher in second gear, the vehicle does not require shifting (is located in a region outside a downshifting allowable line), and thus, the motor 400 has a gain value increased by 10% to 50% of the motor torque in the general driving mode under the control of the controller 300 (although the user allows shifting in the rapid acceleration mode) and the vehicle may secure the instantaneous acceleration.

That is, although the user allows shifting in the rapid acceleration mode, shifting is performed only in a case in which shifting is required and, upon determining that shifting is not required based on the wheel torque map, the motor 400 is controlled to follow the wheel torque map in which shifting is not allowed.

A method for controlling the rapid acceleration mode system according to embodiments of the present disclosure includes storing at least one of the state reference of the battery and the state reference of the vehicle powertrain in the storage (S100), receiving, by the input device 100, the user input regarding whether or not to enter the rapid acceleration mode (S200), outputting, by the controller 300, whether or not the vehicle is capable of entering the rapid acceleration mode by comparing the current state of the battery or the vehicle powertrain with the state reference of the battery or the state reference of the vehicle powertrain (S300), informing the user whether or not the vehicle enters the rapid acceleration mode (S400), and controlling driving of the motor of the vehicle or the driving sound depending on entry of the vehicle to the rapid acceleration mode (S500).

In Operation S100, user settings for at least one of the acceleration level, the deceleration level, the duration time of the rapid acceleration mode, and the driving sound may be further stored.

In Operation S500, when the vehicle enters the rapid acceleration mode, the regenerative braking amount of the vehicle may be controlled depending on the deceleration level stored in the storage.

In Operation S100, a user setting regarding whether or not to perform shifting in the transmission when the vehicle enters the rapid acceleration mode may be further stored, and in Operation S500, the gain value of the motor torque may be varied depending on whether or not to perform shifting in the transmission.

When shifting in the transmission is allowed in Operation S100, in Operation S500, when the vehicle enters the rapid acceleration mode, the gain value of the motor torque may be varied depending on the stored acceleration level.

In Operation S500, the transmission may be controlled to be upshifted when the speed of the vehicle exceeds a designated value, and the gain value of the motor torque may be increased simultaneously with control of the transmission.

When shifting in the transmission is not allowed in Operation S100, in Operation S500, when the vehicle enters the rapid acceleration mode, the gain value of the motor torque may be varied depending on the stored acceleration level.

As is apparent from the above description, in a rapid acceleration mode system of a vehicle and a method for controlling the same according to embodiments of the present disclosure, a user may easily secure instantaneous acceleration of the vehicle compared to the conventional methods, and thus, user driving convenience may be improved.

Further, the rapid acceleration mode of the vehicle is automatically released after a set duration time and then the vehicle returns to the existing mode, and thus, the vehicle may enter the rapid acceleration mode only in a section required by the user, fuel economy (electric economy) may be improved, and durability of a motor may be improved.

In addition, personalized user options for rapid acceleration are provided, thereby being capable of increasing marketability of the vehicle and improving customer satisfaction.

Although the preferred embodiments of the present disclosure have been disclosed for illustrative purposes, those skilled in the art will appreciate that various modifications, additions and substitutions are possible, without departing from the scope and spirit of embodiments of the disclosure as disclosed in the accompanying claims.

What is claimed is:

1. A rapid acceleration mode system of a vehicle, comprising: an input device configured to receive a user input regarding whether or not to select a rapid acceleration mode; a storage configured to store at least one of a state reference of a battery and a state reference of a vehicle powertrain; a notification device configured to inform a user whether or not the vehicle enters the rapid acceleration mode; and a controller configured to: determine whether or not the vehicle is capable of entering the rapid acceleration mode by comparing a current state of the battery or the vehicle powertrain with the state reference of the battery or the state reference of the vehicle powertrain when user selection of the rapid acceleration mode is input through the input device, and output whether or not the vehicle is capable of entering the rapid acceleration mode through the notification device; wherein the storage stores user settings for at least one of an acceleration level, a deceleration level, a duration time of the rapid acceleration mode, and a driving sound; and wherein, when the vehicle enters the rapid acceleration mode, the controller controls driving of a motor and the driving sound based on the user settings stored in the storage.

2. The system of claim 1, wherein the state reference of the battery comprises a state of charge (SOC) or a temperature of the battery, and the state reference of the vehicle powertrain comprises a temperature of a motor or a transmission.

3. The system of claim 1, wherein the storage further stores a user setting regarding whether or not to perform shifting in the transmission when the vehicle enters the rapid acceleration mode, and
wherein the controller is further configured to vary a gain value of a motor torque depending on whether or not to perform shifting in the transmission stored in the storage.

4. The system of claim 3, wherein, in a case in which shifting in the transmission is allowed when the vehicle enters the rapid acceleration mode, the controller is further configured to vary the gain value of the motor torque based on the stored acceleration level.

5. The system of claim 4, wherein, in the case in which shifting in the transmission is allowed when the vehicle enters the rapid acceleration mode, the controller is further configured to control a transmission to be upshifted when a speed of the vehicle exceeds a designated value and increase the gain value of the motor torque simultaneously with control of the transmission.

6. The system of claim 3, wherein, in a case in which shifting in the transmission is not allowed when the vehicle enters the rapid acceleration mode, the controller is configured to vary the gain value of the motor torque based on the stored acceleration level.

7. The system of claim 1, wherein, when the vehicle enters the rapid acceleration mode, the controller is further configured to control a regenerative braking amount of the vehicle depending on the stored deceleration level.

8. A vehicle comprising the system of claim 1.

9. A method for controlling a rapid acceleration mode system of a vehicle, comprising: storing, by a storage, at least one of a state reference of a battery and a state reference of a vehicle powertrain; receiving, by an input device, a user input regarding whether or not to enter the rapid acceleration mode; determine, by a controller, whether or not the vehicle is capable of entering the rapid acceleration mode by comparing a current state of the battery or the vehicle powertrain with the state reference of the battery or the state reference of the vehicle powertrain stored in the storage; output, by the controller to the notification device, whether or not the vehicle is capable of entering the rapid acceleration mode; informing, by the notification device, a user whether or not the vehicle enters the rapid acceleration mode; and controlling, by the controller, driving of a motor of the vehicle or a driving sound depending on entry of the vehicle to the rapid acceleration mode; wherein the storage further stores user settings for at least one of an acceleration level, a deceleration level, a duration time of the rapid acceleration mode, and the driving sound are further stored; and wherein, when the vehicle enters the rapid acceleration mode in the step of controlling, the controller controls the driving of the motor and the driving sound according to the user setting stored in the storage.

10. The method of claim 9, wherein, in the step of controlling driving of the motor of the vehicle or the driving sound, a regenerative braking amount of the vehicle is controlled depending on the deceleration level stored in the storage, when the vehicle enters the rapid acceleration mode.

11. The method of claim 9, wherein, in the step of storing the at least one of the state reference of the battery and the state reference of the vehicle powertrain in the storage, a user setting regarding whether or not to perform shifting in the transmission when the vehicle enters the rapid acceleration mode is further stored, and wherein in the step of controlling driving of the motor of the vehicle or the driving sound, a gain value of a motor torque varies depending on whether or not to perform shifting in the transmission.

12. The method of claim 11, wherein, when shifting in the transmission is allowed in the step of storing the at least one of the state reference of the battery and the state reference of the vehicle powertrain in the storage, in the step of controlling driving of the motor of the vehicle or the driving sound, the gain value of the motor torque varies depending on the stored acceleration level, when the vehicle enters the rapid acceleration mode.

13. The method of claim 12, wherein, in the step of controlling driving of the motor of the vehicle or the driving sound, a transmission is controlled to be upshifted when a speed of the vehicle exceeds a designated value, and the gain value of the motor torque is increased simultaneously with control of the transmission.

14. The method of claim 11, wherein, when shifting in the transmission is not allowed in the step of storing the at least one of the state reference of the battery and the state reference of the vehicle powertrain in the storage, in the step of controlling driving of the motor of the vehicle or the driving sound, the gain value of the motor torque varies depending on the stored acceleration level, when the vehicle enters the rapid acceleration mode.

* * * * *